J. LIMMER.
BREAD LABELING DEVICE.
APPLICATION FILED JAN. 10, 1910.
959,767.
Patented May 31, 1910.
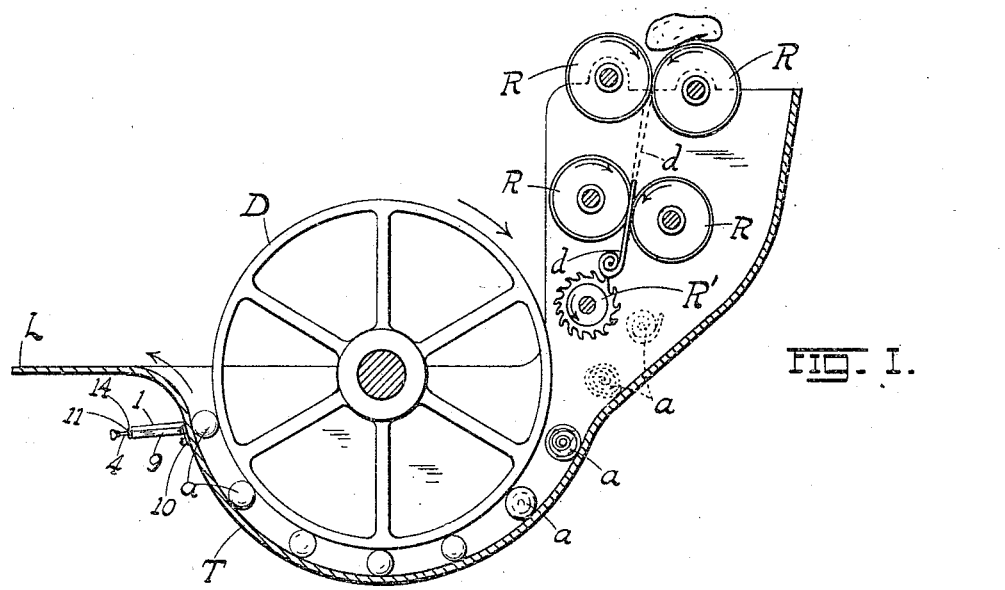
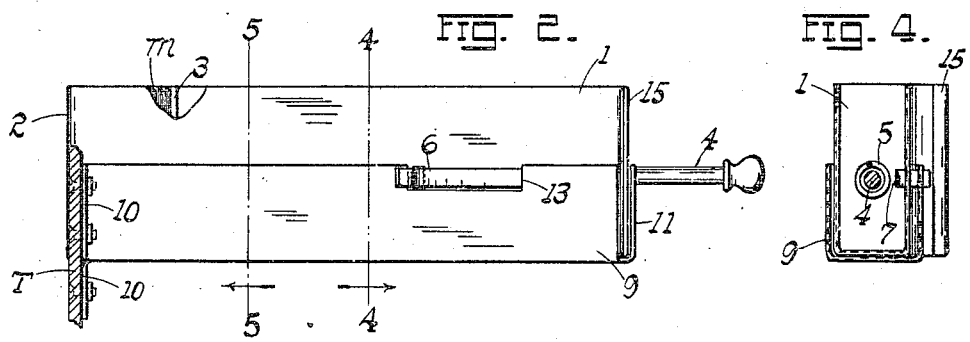 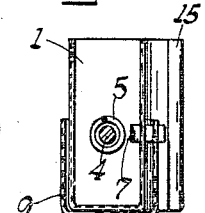
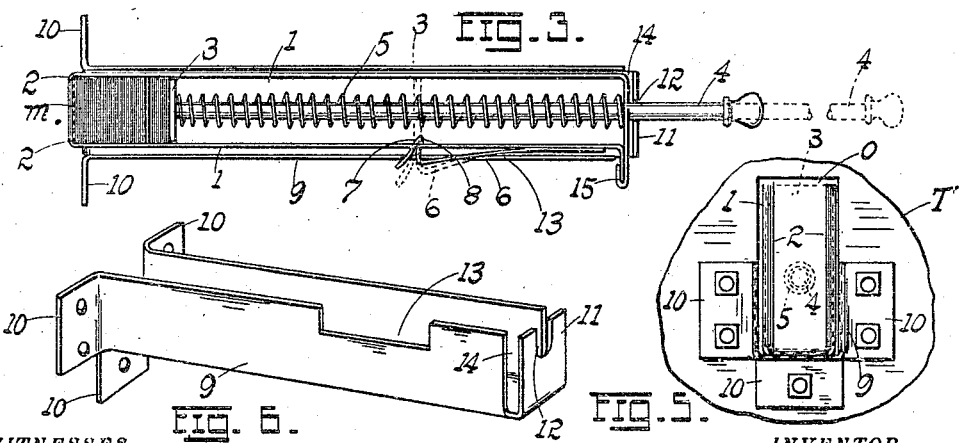
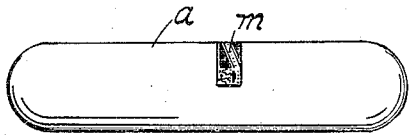
WITNESSES:
Harry A. Beimer
Josamichel
INVENTOR.
John Limmer.
BY
ATTORNEY.

UNITED STATES PATENT OFFICE.

JOHN LIMMER, OF ST. LOUIS, MISSOURI.

BREAD-LABELING DEVICE.

959,767.  Specification of Letters Patent.  Patented May 31, 1910.

Application filed January 10, 1910. Serial No. 537,322.

*To all whom it may concern:*

Be it known that I, JOHN LIMMER, a citizen of the United States, residing at St. Louis, State of Missouri, have invented certain new and useful Improvements in Bread-Labeling Devices, of which the following is a full, clear, and exact description, reference being had to the accompanying drawings, forming a part hereof.

My invention has relation to improvements in bread-labeling devices; and it consists in the novel details of construction more fully set forth in the specification and pointed out in the claim.

In the drawings, Figure 1 is a longitudinal diagrammatic vertical section of a bread forming machine showing my invention applied thereto; Fig. 2 is a side elevation of the attachment assembled; Fig. 3 is a top plan thereof; Fig. 4 is a cross section on the line 4—4 of Fig. 2; Fig. 5 is a cross-section on line 5—5 of Fig. 2, with plunger and follower omitted; Fig. 6 is a perspective of the bracket or shield for supporting the label holder; and Fig. 7 is a plan of piece of dough with label attached.

The object of the present invention is to provide an attachment to conventional forms of bread making machines whereby the bread or individual loaves may be automatically labeled as the dough pieces are advanced through the machine.

A further object is to provide an attachment which will be simple, positive in its action, readily attached to any existing machine, one capable of being operated by hand, and one possessing further and other advantages better apparent from a detailed description of the invention, which is as follows:—

Referring to the drawings, R, R, represent series of pairs of rollers between which the necessary weight (1 lb.) of dough is inserted whereby it is rolled out into sheets $d$ each sheet being engaged by a serrated roller R' which rolls up the sheet into a cylinder of dough $a$, the latter dropping to the bottom of a curved trough or casing T, along which it is advanced by a drum D to a depositing ledge L where the successive dough cylinders are removed and transferred to an oven. The features referred to are old and well known in the art, and are here shown only conventionally as they form no part of the present invention.

Formed in the bottom of the trough T in the path of travel of the dough pieces or cylinders $a$ (the same being substantially cylindrical in form) is an opening $o$ opposite which my labeling attachment is secured. Said attachment consists essentially of a holder or trough 1 of oblong shape closed at the end opposite the opening $o$, and open at the end adjacent to said opening $o$, the side walls of the holder terminating at the open or discharge end in inturned flanges or lips 2 which engage the edges of the mucilaged bottom faces of the labels $m$ placed in the holder, thus temporarily at least preventing the labels from being expelled from the holder any faster than they are withdrawn by contact with the moist dough pieces $a$, in the passage of the latter over the mucilaged faces of the labels. Bearing against the front side of the first label of the series packed in the holder is a head or follower 3 which is secured at the inner end of a piston rod or plunger 4 passed loosely through the closed end of the holder, the follower being forced against the labels by an expanding spring 5 coiled about the piston-rod and bearing with one end against the outer terminal wall of the holder, and with the other against the follower 3.

Mounted on the outside of one of the side walls of the holder and fixed at one end to such wall is a spring-pawl or trigger 6 provided at its free end with an inclined tooth 7 operating freely through the wall of the holder and terminating within the holder in a shoulder 8. By drawing on the rearward projecting end of the piston-rod 4 the follower or head 3 may be retracted until it engages the inclined face of the tooth 7 when it will automatically force the trigger outwardly (the incline being of the proper pitch to allow the head 3 to wedge itself past the tooth) after which the tooth will spring back into the holder permitting the head 3 in its retracted position to rest against the shoulder 8 of the trigger, the head being thus held back by the trigger until the holder is filled with a fresh lot of labels. To release the head 3, the trigger is withdrawn sufficiently to remove the support of the shoulder 8 when the spring 5 will drive the head against the labels and expel them as fast as they are successively removed by their adhesion to the advancing series of dough units or cylinders $a$.

Of course, any suitable means for supporting the label holder in position may be resorted to, but in the present case a special supporting bracket has been improvised. It consists of an outer trough or shield 9 secured by terminal lips 10, 10 to the outer wall of the trough T, the said shield having an outer terminal wall 11 provided with a recess 12 for the free passage therethrough of the piston rod or plunger 4, a recess 13 being likewise formed in the side wall of the bracket for the free passage therethrough of the trigger head or tooth 7. To avoid longitudinal displacement of the label holder 1 in its supporting bracket 9, the sides of the outer terminal wall 11 are preferably severed or spaced from the side walls of the bracket, whereby there is thus left a recess 14 for the reception of the wing 15 forming a lateral extension of the outer terminal closed wall of the label holder. The wing 15 thus bearing against the edge of the side wall of the bracket prevents any possible displacement of the label holder, inwardly or toward the opening o. This leaves the innermost label or that directly exposed to the dough pieces a in proper position to afford the necessary contact of its mucilaged face with the dough, and permit its individual removal from the remaining labels of the series.

The operation is substantially as follows:—As the units of moist dough a are advanced along the trough T past the opening o, each piece of dough contacts with the mucilaged face of the exposed label, the adhesion being sufficient to draw the edges of the label off from the supporting lips or flanges 2, leaving the next label supported by the said flanges 2 to be picked off by the next succeeding unit of dough a. Of course, the tension of the spring 5 must be sufficient to maintain a constant feed or advance of the labels toward the lips or flanges 2, but it must not force them past the flanges. The area of support afforded by the flanges 2 on the other hand must be quite restricted so as to expose the maximum surface of the mucilaged face of the label to the dough, and likewise permit a ready abstraction of the adhering label from the rest of the series. When the labels are exhausted, the holder is removed from its supporting bracket, then refilled and subsequently replaced, and the operation repeated. By "bread" is here meant not only the conventional loaf of bread, but any cake, or equivalent bakery product which it is desirable shall bear a manufacturer's label.

Having described my invention, what I claim is:—

In combination with a trough-shaped bread-label holder having a discharge end positioned in the path of travel of the dough pieces of a bread machine, the terminal wall opposite the discharge end being extended laterally and forming a wing beyond the adjacent side wall of the trough, a bracket-shield or casing for supporting the holder and provided with a terminal wall spaced or severed from the side walls of the bracket whereby a recess is formed for the reception of the wing of the holder aforesaid, and longitudinal displacement of the holder prevented.

In testimony whereof I affix my signature, in presence of two witnesses.

JOHN LIMMER.

Witnesses:
 EMIL STAREK,
 JOS. A. MICHEL.